United States Patent [19]

Fortune

[11] Patent Number: 5,483,040
[45] Date of Patent: Jan. 9, 1996

[54] ELECTRICALLY HEATED HOT GAS SOLDERING INSTRUMENT

[76] Inventor: William S. Fortune, 29866 Cuthbert Rd., Malibu, Calif. 90265

[21] Appl. No.: 14,361

[22] Filed: Feb. 5, 1993

[51] Int. Cl.[6] .............................. B23K 3/02; H05B 3/00; F24H 1/10
[52] U.S. Cl. ..................... 219/230; 228/20.5; 392/379
[58] Field of Search ..................... 219/230; 228/201, 228/20.5; 392/379, 476; 126/414

[56] References Cited

U.S. PATENT DOCUMENTS

| | | | |
|---|---|---|---|
| 408,772 | 8/1889 | Wagant | 126/413 |
| 1,350,181 | 8/1920 | Remane | 126/413 |
| 1,451,578 | 4/1923 | Kyger | 126/413 |
| 1,486,924 | 3/1924 | Ruppel | 126/413 |
| 1,831,799 | 11/1931 | Anderson | 126/413 |
| 1,954,503 | 4/1934 | Suess | 126/413 |
| 2,477,195 | 7/1949 | Moody | 126/413 |
| 2,515,462 | 7/1950 | McGruer | 126/413 |
| 4,419,566 | 12/1983 | Fortune | 219/230 |
| 4,926,028 | 5/1990 | Fortune | 219/230 |
| 5,054,106 | 10/1991 | Fortune | 392/476 |

FOREIGN PATENT DOCUMENTS

| | | | |
|---|---|---|---|
| 28320 | 9/1921 | Denmark | 126/413 |
| 8021 | of 1889 | United Kingdom | 126/413 |
| 11452 | of 1900 | United Kingdom | 126/414 |
| 3858 | of 1905 | United Kingdom | 126/413 |
| 110250 | 10/1917 | United Kingdom | 126/413 |
| 149909 | 12/1920 | United Kingdom | 126/413 |

*Primary Examiner*—John A. Jeffery
*Attorney, Agent, or Firm*—Daniel T. Anderson

[57] ABSTRACT

An electric soldering iron is disclosed in which a gas such as compressed air is electrically heated and then forced through a metallic soldering tip which is deeply slotted or finned for maximum heat transfer thereto. Soldering is then accomplished by applying the thusly heated tip to the workpiece. The slots may be formed to exhaust the hot gas forwardly over the tip to add heat to the workpiece and control the gaseous environment thereof; or the slots may be formed to exhaust the hot gas laterally or rearwardly to help in removing pollutants from the operator's environment.

2 Claims, 4 Drawing Sheets

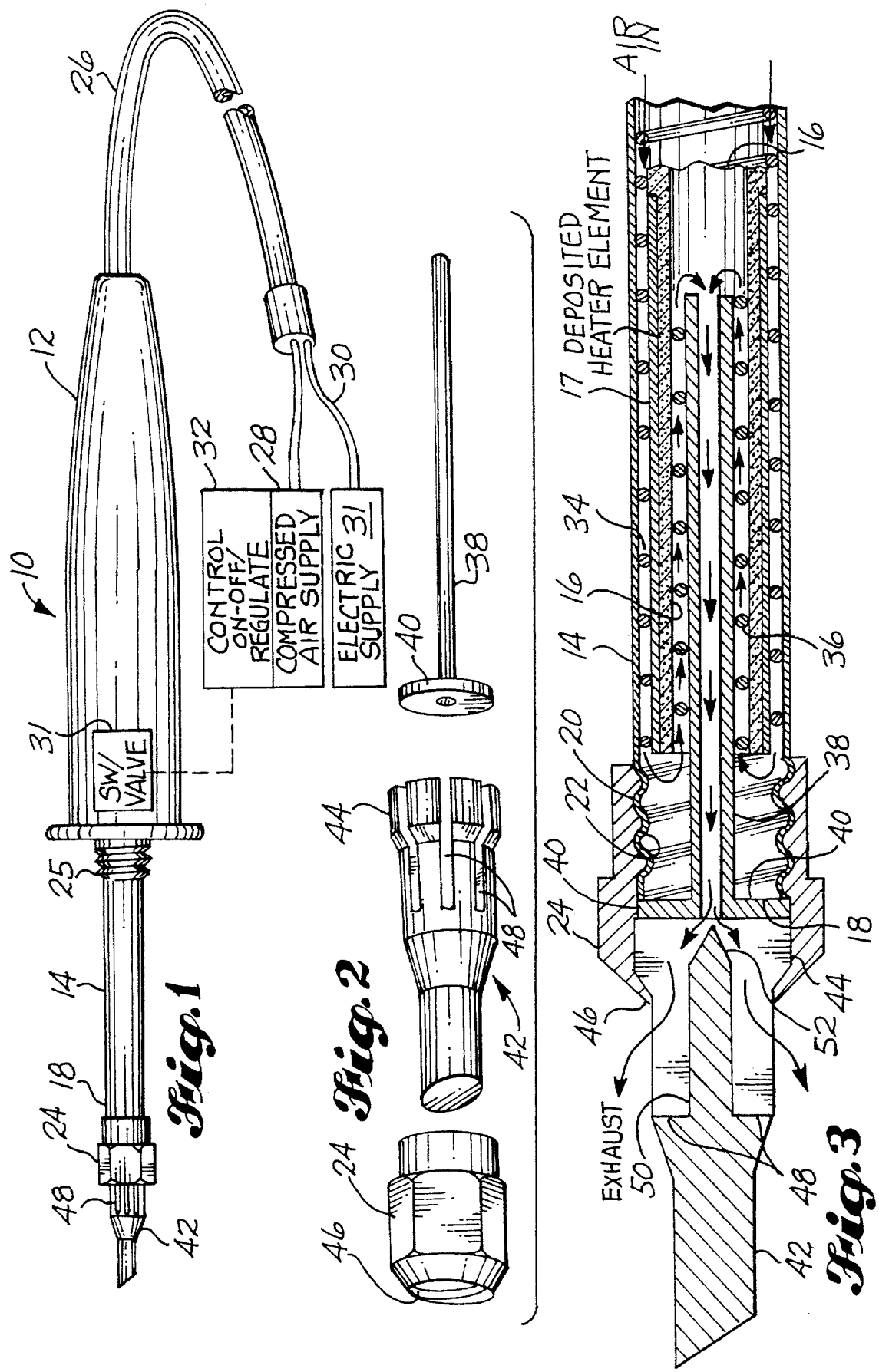

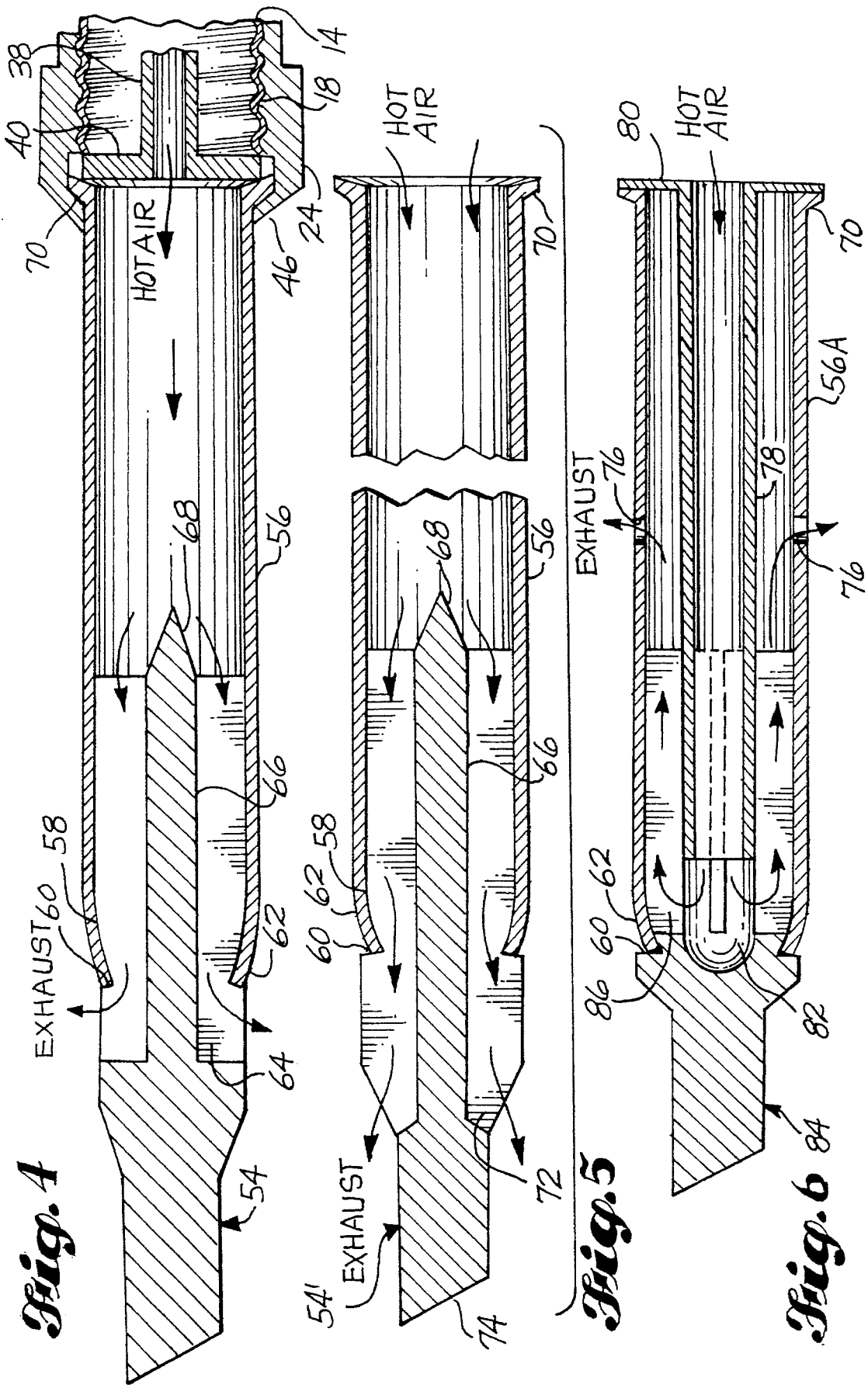

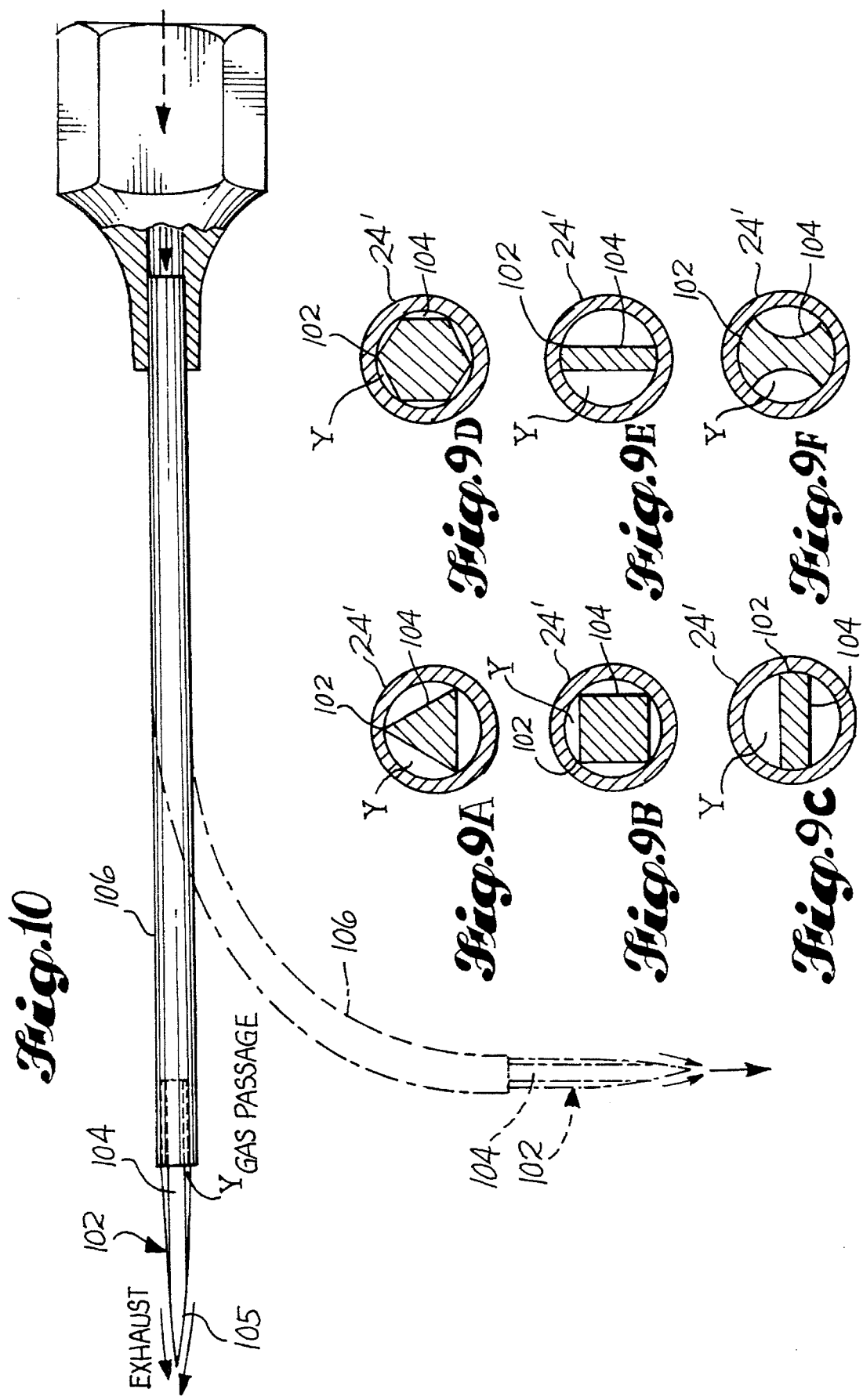

ELECTRICALLY HEATED HOT GAS SOLDERING INSTRUMENT

BACKGROUND OF THE INVENTION

This invention relates generally to the field of electrically heated hand held soldering/desoldering tools and, more particularly, to such instruments which utilize a stream of gas to convey heat from its source along a path to the soldering point, the term "hand held" being intended to include robotic or robot-like applications. The term "gas" as used here usually means ambient air, but may include inert or relatively inert gases such, for example, as carbon dioxide or nitrogen or the noble gases or the like as when oxidations, corrosive reactions, or other undesired chemical action is to be minimized.

The advantages of hot gas soldering have become known and understood in recent years and are discussed in detail in Applicant's United States Patents: HOT AIR SOLDERING AND RESOLDERING SYSTEM, U.S. Pat. No. 4,419,566; HOT AIR HEATED SOLDERING INSTRUMENT, U.S. Pat. No. 4,926,028; and HOT GAS SOLDERING SYSTEM, U.S. Pat. No. 5,054,106. Hot gas soldering by a stream of very hot gas with a small cross section can apply precisely the desired quantity of heat at the desired work point without deleteriously heating other adjoining or contiguous material or objects. In addition, the gas stream presents to the work point a substantially constant temperature heat source—unlike a conventional soldering tip the temperature of which inherently varies somewhat as varying amounts of heat are drawn therefrom and then replenished along a metal conduction path. A related advantage is that the gas may be heated instantly as it flows across, in heat exchange relation, the heat source and is instantly applied to the work point while a conventional soldering tool, exhibiting a significantly greater degree of thermal inertia, requires that heat be conducted through the solid components of the tool until the tip, inherently at some distance from the source, reaches a temperature adequate for working.

It may also be pointed out that by hot gas techniques, a low inertial soldering tip may be heated on its inside by an internally directed stream of hot gas providing most of the above advantages. In addition, although the soldering action is more like conventional soldering, the tip may be very desirably of iron composition since copper is not needed for its high thermal conductivity. Thusly avoided are the weight and expense of copper and its plating as well as its high vulnerability to decay by chemical reactions aggravated by its intense thermal environment.

These and other advantages of hot gas soldering have not been fully achieved in the prior art because of the difficulty of generating the gas stream, satisfactorily heating it, and providing means for shaping it and directing it upon the work point.

It is accordingly an object of the present invention to provide an electrically heated hot gas soldering system which achieves these advantages of hot gas techniques.

It is another object to provide such a system including a soldering tip which is substantially instantly heated and continuously supplied with heat by a gas stream along an otherwise high thermal resistance path.

It is another object to provide such a system which substantially instantly generates and applies to a work point a hot gas stream of predetermined cross section at a temperature of the order of 1500 degrees Fahrenheit and with a predetermined desired rate of heat energy flow to the work point.

It is another object to provide such a system in which the soldering tip may idle at a relatively low temperature and yet be instantly heated to its working temperature by the hot gas when desired, thusly providing significant advantages in tip longevity and in its plating requirements.

It is another object to provide such a system in which the gas supply to the soldering instrument may be somewhat preheated by the electrical conductors conveying power to the heating element and in which the soldering instrument handle is cooled by the flow therethrough of the gas.

It is another object to provide gas heating apparatus for such a system which is exceedingly effective and efficient in supplying a very high temperature stream of air for soldering.

It is another object to provide such a system which is structurally simple, reliable, mechanically rugged, and inexpensive to manufacture.

It is another object to provide such a system in which the temperature of the heating element is electronically controlled remotely from the body of the soldering instrument itself.

SUMMARY OF THE INVENTION

Briefly, these and other objects are achieved in accordance with the structural aspects of a presently preferred example of the invention in which gas, air, for example is electrically heated within a soldering iron and then directed upon inner surfaces of the soldering tip to maintain it at its desired working temperature. The rear body of the tip is deeply slotted or finned to form passages for the hot gas which transfers its heat to the tip as it is propelled therethrough. The slots may be formed to exhaust the hot gas forwardly over the tip and onto the workpiece to add general heat thereto and, when the gas is inert, to provide a protective cloud thereover to minimize corrosion, decomposition, or the like which would otherwise be serverely agravated by the soldering heat, In other examples, the slots may be formed to exhaust the gas laterally or rearwardly for purposes of clearing the environment of the operator. In yet other examples of the invention, the slots may be formed to exhaust the hot gas smoothly, in laminar flow, forwardly over the tip and impinge in a collimated manner upon the workpiece.

DESCRIPTIVE LISTING OF DRAWING FIGURES

FIG. 1 is an overall view of an example of a hot gas soldering system constructed in accordance with the principles of the present invention;

FIG. 2 is an exploded view of the soldering tip, retaining nut, and heat transfer tube portions of the system of FIG. 1;

FIG. 3 is a longitudinal sectional view of the front portion of the structure of FIG. 1 showing the apparatus of FIG. 2 in its assembled configuration;

FIG. 4 is a longitudinal sectional view of the tip portions of an alternative example of the invention;

FIG. 5 is a similar view of another version of the invention;

FIG. 6 is a similar view of yet another example of the invention;

FIGS. 9A–9F are cross sectional views of examples of the structure of FIG. 8 taken along the reference lines 9—9 thereof; and FIG. 10 is an elevational view, partially in section, of an example similar to that of FIG. 8 having an elongated bendable tubular support for the needle tip.

DETAILED DESCRIPTION OF PREFERRED EMBODIMENT

Figure 7:
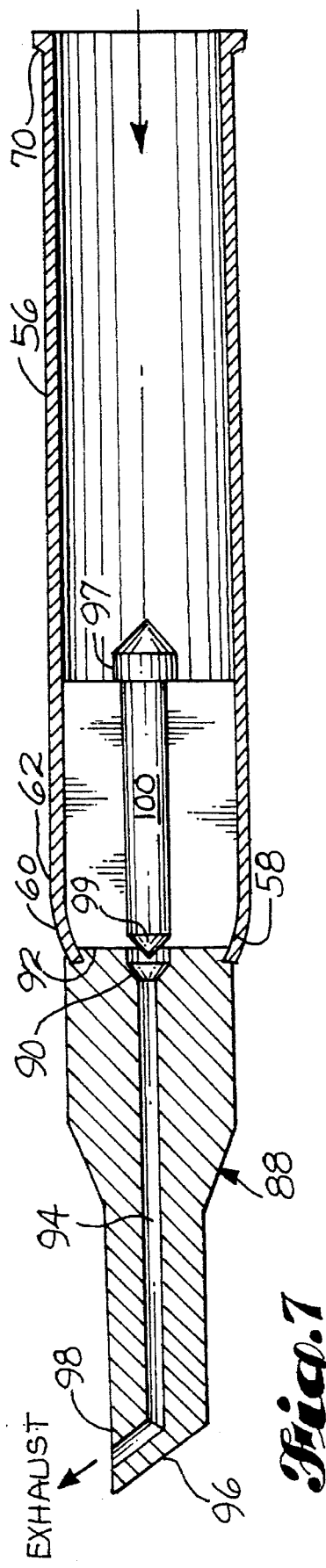
FIG. 7 is a similar view of still another example of the invention.

The example of the invention illustrated in FIGS. 1, 2, and 3 includes a hand held soldering instrument 10 having a handle portion 12 which supports a forwardly extending stainless steel tube 14 which houses, in turn, a hollow cylindrical ceramic heating element 16 with a deposited resistive heater 17 contiguously to its forward end, and which is provided at its tip 18 with external threads 20 adapted to mate with the internal threads 22 of a retaining nut 24. A second set of retaining threads 25 is shown disposed contiguously to the handle portion 12 and is useful in attaching an outer sleeve over the heater tube 14, its purposes being otherwise deemed not pertinent to this disclosure.

At the rear of the handle portion 12, a coupling to a combination air hose and electrical cable housing 26 is shown. A supply of compressed gas such as, for example, an air compressor 28 is coupled to the housing 26 such that air may be supplied from the source 28, through the housing 26 wherein it provides some cooling for the electrical leads 30 from a power supply 31 which may desirably be of the character described in U.S. Pat. Nos. 4,507,546, and 4,734, 559 issued to William S. Fortune and Wayne A. Murray. Such a power supply circuit remotely controls the temperature of the heating element heater 17 by using, for a very short portion of the period of each cycle, including the inflection point, of the applied alternating current to effect a resistance measurement of the electric heating element 17, the magnitude of its electrical resistance being a function of its temperature. A signal representative of the instantaneous value of the resistance is then generated which is used in a feedback mode to control the current flow to the heating element to cause it to be maintained at a predetermined, desired temperature. Thusly, without a separate sensor in the soldering tip or its heater and without separate leads being used for a temperature feedback signal, essentially full wave power may be continuously impressed on the heater. Alternatively, however, a conventional separate sensor technique may be utilized when desired.

The air supply may be continuously energized with a finger tip valve in the handle 12 controlling the flow of air through the heating element; or a remote electrical switch 31 in the handle may turn the compressor on as desired; or the supply 28 may be controlled by a separate switch such as a hand or foot momentary contact switch 32. It may be noted that the air flows through the interior of the handle 12 which may function as a plenum chamber and thence through the stainless steel heater tube 14 behind the heater 17; and this flow of coolant fluid may significantly cool the handle 14 adding comfort for the operator.

In FIG. 3 the path of the air forwardly through the tube 18 is seen to be over the outer surface of the ceramic heater tube 16 in a helical pattern between the turns of a spring-like element 34 to maximize the heat exchange between the heater 17 and the air. At the forward end 18 of the tube 14 the air is turned radially inwardly and thence rearwardly along the turn of a second heat exchange enhancing spring-like element 36 disposed between the inner surface of the heater tube 16 and the outer surface of a copper, heat collector tube 38. The air is then again turned radially inward and passed forwardly through the collector tube 38. The forward end of the tube 38 is formed in a flange 40 having an outer diameter approximately equal to that of the end 18 of the tube 14.

A slotted soldering tip 42 is shown disposed with its rear surface pressed against the forward surface of the flange 40. It is formed with an enlarged diameter retaining shoulder 44 about its rear end and is held by a reduced diameter, inwardly extending retaining shoulder 46 forming the forward lilp of the retaining unit 24.

The tip 42 is provided with a set of four but preferably six or eight, or more, slots 48 which extend from its rear surface to, in this example, a point midway along the length of the tip element. The slots extend radially from a core portion 50 which way, as shown, be streamlined to a point 52 to aid in the flow of the heated air from the forward end of the collector tube and through the slots 48 to exhaust laterally outwardly as indicated by the "exhaust" arrows.

In FIG. 4 the slotted soldering tip 54 is provided with a stainless steel extension support tube 56. Instead of the enlarged diameter retaining shoulder 44 of the soldering tip 42, the tip 54 has a tapered groove 58 formed about its rear body portion and terminates in a retaining shoulder 60 at its forward end. The forward end 62 of the tube 56 is shown crimped radially into the groove and abutting the shoulder 60 to support the tip 54, the tube otherwise having an inner diameter equal to that of outer body of the rear portion of the tip body. As in the previous example, the tip 54 is provided with a set of slots 64 which extend from the rear of the tip to a point on its body forward of the crimped end of the support tube 56. An inner core 66 determines the radially inward extent of the slots 64 and may be terminated at its rear end in a streamlining point 68.

The tip 54 by its support tube 56 is secured to the front end 18 of the tube 14 by the retaining nut 24 which, as shown, engages a rear, retaining flange 70 on the support tube 56. Again the flange 40 of the heat collector tube 38 is compressed between the soldering tip, or its support, and the threaded end 18 of the support tube 14. As shown, the heated air is exhausted laterally outwardly from the slots forwardly of the front end 62 of the support tube 56.

Referring to FIG. 5, the support tube 56 and tip 54' may be considered to be identical with that illustrated in FIG. 4 except that the heat exchanging set of slots 72 extend further forwardly and the exhausted hot air is directed forwardly in a laminar flow relation over the forward portion of the tip 54'. By this means, the hot air may, in addition to heating the working portion 74 of the tip, be useful in providing additional heat to the workpiece as, for example, in preheating it or a component thereon. It is also to be noted that the hot gas may be an inert fluid which shrouds the work point and protects it from oxidation or other corrosive effects.

In FIG. 6, an example of the invention is illustrated in which the exhausted hot air is removed well rearwardly of the working tip in order to keep the moving air away from the workpiece. In this example the support tube 56A is provided with a set of exhaust ports 76 and an inner supply tube 78 which is supported with a rear flange 80 extending radially out to and secured across the rear surface of the retaining flange 70. The supply tube extends forwardly into a central bore 82 of a slotted soldering tip 84. The bore extends forwardly beyond the end of the supply tube and communicates with a set of heat exchange slots 86 whereby hot air traveling forwardly in the supply tube 78 impinges upon the forward end of the bore 82 and the slotted body of the tip 84 and then is exhausted rearwardly through the ports 76.

The example of a slotted tip 88 in FIG. 7 is formed with a rear bore 90 which extends forwardly into the body of the tip to a point beyond the forward edge of a set of heat exchange slots 92. The bore then communicates with a capillary or duct 94 that extends centrally forwardly to a point contiguous to the working face 96 of the tip and then turns outwardly to an exhaust port 98 from which a jet of hot air may be directed to a specific position on the workpiece. By this means, direct hot air soldering or desoldering may be accomplished; or when desired a combination technique may be employed whereby one part of a soldered terminal of a surface mounted device may be heated by the working face 96 while at the same time another part is heated by the hot air jet. A flow control and support pin 100 is shown inserted into the bore 90. The pin is provided with an enlarged diameter rim 97 at its rear end to form a retaining shoulder against the rear of the body of the tip 88. The forward end 99 of the pin 100 is disposed rearwardly of the front edge of the slots 92 and the bore 90 whereby the flow of hot air is forced through the slots 92, over the front of the pin 100, and into the duct 94. Both ends of the pin 100 may be streamlined as shown. In practice the pin 100 has been found useful in supporting the slotted portion of the body of the tip 88 when the end 62 of the support tube 56 is crimped inwardly into the groove 58.

Figure 8:
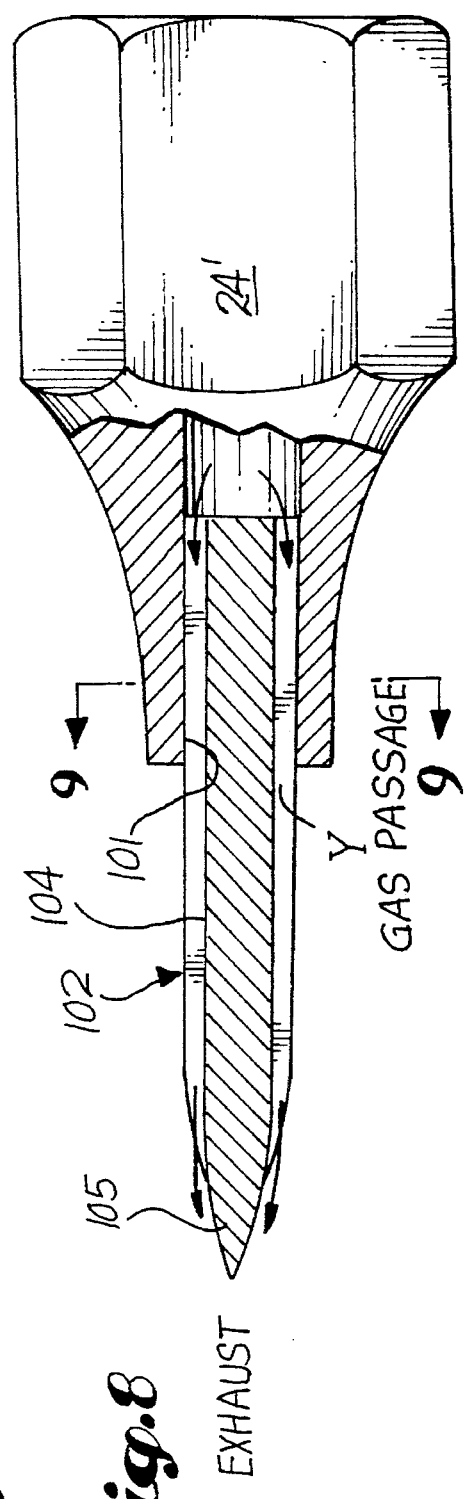
FIG. 8 is a partially sectioned view of an example of the invention including a needle tip heated by a laminar flow of hot air along slots, channels, or flats in its sides.

Referring to FIG. 8, an example of the invention is illustrated in which the slotted tip has the form of a needle with longitudinal gas passage channels along its length to carry the hot air in a laminar flow relation therealong. A retaining nut 24' is adopted at its forward tip to retain in its central bore 101 a needle soldering tip 102. The needle is provided with channels or flats 104 along its length and a pointed forward end 105. In operation, the retaining nut 24' is threaded onto the forward threaded end 18 of the support tube 14 and hot air is fed through the bore 101 along the channels 104 of the needle tip 102. The tip is thereby heated and the laminar flow of hot air forms a precision point of hot air for soldering or for soldering or desoldering. In a presently preferred configuration the needle 102 is of stainless steel, nonsolderable, and is exceedingly useful in removing solder from between closely spaced parallel terminals or other conductors: the hot air melts the solder and the fine point is able to sweep clean the interterminal space.

FIGS. 9A through 9F illustrate a series .of useful cross-sectional configurations for the needle tip 102 of FIG. 8: triangular, square, parallel flats, hexagonal, knife, and opposing channels, respectively.

In FIG. 10, the needle tip 102 is retained at the forward end of a stainless steel extension tube 106 which is, in turn, at its base end, supported by the forward end of the retaining nut 24'. The extension tube is bendable, as indicated by the broken lines, to optimize its utility in special circumstances.

There have thus been disclosed and described several examples of a hot air heated system in which a soldering tip in the flow of the heated air is slotted to increase greatly its total heat take up and its rate of heat take up from the hot air. Such a tip may thereby be so quickly heated that it need not be idle at a high temperature in order always to be ready for use by the operator. Accordingly heat energy is saved that would normally be lost from a fully heated idling tip. Of even more significance, however, is the conservation or longevity of the tip because its overall duty cycle is very low; that is, it spends relatively little time at its high working temperature and therefore deteriorates much more slowly than a prior art tip. An important ramification of this is that plated tips which are expensive and are environmentally offensive to produce or replate last much longer or can be avoided altogether. Thus a plain copper tip exhibits a useful and economic life as does an inexpensively and simply iron or nickel plated tip.

In examples of the invention constructed along the lines of that illustrated in FIG. 4, the tip 54 may idle at a temperature 300° F. below that of the heating element and yet be brought up to working temperature in approximately one second because the high velocity air transports the energy to the tip with no thermal inertia while the thin walled stainless steel tube 56 isolates, to a significant extent, the tip from the heater with respect to any metallic conduction path.

I claim:

1. A hot gas heated soldering tip for an electrically powered hand held soldering tool comprising:

a metal body having an axial length and a front, working end including a solder contacting surface and a rear, heat take up end, said body being formed with axial-radial slots extending from its said rear end forwardly thereof to a point at least midway along its length, said slots providing a plurality of elongate heat absorbing surfaces of the character to absorb thermal energy in a heat exchange relation with hot gas impressed upon said rear end of said body and flowing therefrom along said slots, said body comprising a front portion terminated by said solder contacting surface of said working end, a mid portion of increased diameter, and a rear portion terminated by said heat take up end and having a further enlarged diameter portion forming a retaining shoulder, said slots extending from said rear end and at least partially through said mid portion.

2. The invention as set forth in claim 1 in which the forward edge of each of said slots is slanted significantly forwardly whereby said hot gas flowing forwardly along said slots is exhausted therefrom forwardly and over the outer surface of said front portion of said body.

* * * * *